(12) United States Patent
Fröhlich et al.

(10) Patent No.: US 11,205,931 B2
(45) Date of Patent: Dec. 21, 2021

(54) ELECTRIC MACHINE AND ROTOR WITH COOLING CHANNEL

(71) Applicant: CPT Group GmbH, Hannover (DE)

(72) Inventors: Holger Fröhlich, Berlin (DE); Isao Fukumoto, Berlin (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 221 days.

(21) Appl. No.: 16/468,879

(22) PCT Filed: Dec. 13, 2017

(86) PCT No.: PCT/EP2017/082526
§ 371 (c)(1),
(2) Date: Jun. 12, 2019

(87) PCT Pub. No.: WO2018/108968
PCT Pub. Date: Jun. 21, 2018

(65) Prior Publication Data
US 2019/0356187 A1    Nov. 21, 2019

(30) Foreign Application Priority Data
Dec. 15, 2016   (DE) .................... 10 2016 225 180.5

(51) Int. Cl.
*H02K 1/32*     (2006.01)
*H02K 5/20*     (2006.01)
(Continued)

(52) U.S. Cl.
CPC ............. *H02K 1/32* (2013.01); *H02K 5/20* (2013.01); *H02K 9/06* (2013.01); *H02K 9/19* (2013.01);
(Continued)

(58) Field of Classification Search
CPC .. H02K 9/02; H02K 9/04; H02K 9/06; H02K 9/19; H02K 9/193; H02K 9/197;
(Continued)

(56) References Cited

U.S. PATENT DOCUMENTS 2,764,704 A   9/1956  Wolf ............................... 310/61
2,940,393 A   6/1960  Baker ............................. 417/50
(Continued)

FOREIGN PATENT DOCUMENTS

CA    2 972 225 A1    6/2016  ............... H02K 1/24
CN    101755376 A     6/2010  ............. H02K 21/14
(Continued)

OTHER PUBLICATIONS

Received STIC search report from EIC 2800 searcher Steve Chung on Feb. 25, 2021 (Year: 2021).*
(Continued)

*Primary Examiner* — Shawki S Ismail
*Assistant Examiner* — Htet Z Kyaw
(74) *Attorney, Agent, or Firm* — Slayden Grubert Beard PLLC

(57) ABSTRACT

Various embodiments include a rotor for an electric machine comprising: a laminated rotor core; a filler body comprising an aluminum die-cast alloy cast onto the laminated rotor core; a first shaft journal having an air inlet opening; a second shaft journal having an air outlet opening; and a ventilation unit. The filler body connects the laminated rotor core rotationally conjointly to the shaft journals. The laminated rotor core includes a central axial bore partially filled by the filler body forming an axial cooling channel for cooling air within the central axial bore. The shaft journals drive the ventilation unit. Rotation of the ventilation unit draws an air stream in via the air inlet opening, conveys said
(Continued)

air stream through the axial cooling channel, and discharges said air stream via the air outlet opening.

10 Claims, 9 Drawing Sheets

(51) Int. Cl.
| | |
|---|---|
| *H02K 9/06* | (2006.01) |
| *H02K 9/19* | (2006.01) |
| *H02K 17/16* | (2006.01) |
| *H02K 21/14* | (2006.01) |

(52) U.S. Cl.
CPC .......... *H02K 17/165* (2013.01); *H02K 21/14* (2013.01); *H02K 2205/09* (2013.01)

(58) Field of Classification Search
CPC .. H02K 9/20; H02K 9/28; H02K 9/00; H02K 1/32; H02K 5/20; H02K 17/165; H02K 21/14; H02K 2205/09; H02K 1/185; H02K 1/276; H02K 1/30; H02K 5/06; H02K 7/003; H02K 17/16
USPC ............ 310/54, 61, 62, 63, 57, 58, 59, 60 A
See application file for complete search history.

(56) References Cited

U.S. PATENT DOCUMENTS

| | | | | |
|---|---|---|---|---|
| 7,646,119 | B2* | 1/2010 | Schmidt ............... | H02K 15/024 310/61 |
| 8,242,645 | B2 | 8/2012 | Tatematsu et al. ............. | 310/61 |
| 9,787,164 | B2 | 10/2017 | Büttner et al. | |
| 2002/0195887 | A1* | 12/2002 | Kobayashi ............... | H02K 9/19 310/61 |
| 2004/0217666 | A1* | 11/2004 | Mellor ................... | H02K 1/276 310/156.53 |
| 2005/0269893 | A1 | 12/2005 | Fujimoto ................... | 310/12.15 |
| 2010/0231066 | A1 | 9/2010 | Körner ............................ | 310/61 |
| 2010/0264760 | A1* | 10/2010 | Matsui ..................... | H02K 9/19 310/54 |
| 2011/0024073 | A1* | 2/2011 | Kamiyama ............ | H02K 15/03 164/340 |
| 2012/0133236 | A1* | 5/2012 | Buttner ............... | H02K 15/0012 310/211 |
| 2012/0326555 | A1* | 12/2012 | Arimatsu .................. | H02K 1/30 310/216.121 |
| 2014/0333163 | A1* | 11/2014 | Horii .......................... | H02K 1/32 310/59 |
| 2017/0194835 | A1* | 7/2017 | Miyake .................. | F03D 1/0625 |
| 2018/0147937 | A1 | 5/2018 | Muster et al. | |
| 2019/0103778 | A1* | 4/2019 | Paul .......................... | H02K 9/12 |
| 2019/0214888 | A1* | 7/2019 | Andersson ............... | H02K 5/20 |

FOREIGN PATENT DOCUMENTS

| | | | | |
|---|---|---|---|---|
| CN | 104285361 A | 1/2015 | ............... | H02K 17/16 |
| DE | 1 162 466 B | 2/1964 | ............... | H02K 1/28 |
| DE | 94 08 559 U1 | 11/1994 | ............... | H02K 1/32 |
| DE | 196 35 196 A1 | 3/1998 | ............... | H02K 1/20 |
| DE | 102 26 572 A1 | 1/2004 | ............... | H02K 1/30 |
| DE | 10 2008 043 367 A1 | 5/2010 | ............... | B60K 6/22 |
| DE | 10 2009 012 324 A1 | 9/2010 | ............... | H02K 1/32 |
| DE | 10 2009 025 929 A1 | 12/2010 | ............... | H02K 1/27 |
| DE | 10 2012 110 157 A1 | 6/2014 | ............... | H02K 1/22 |
| DE | 10 2015 205 724 A1 | 6/2016 | ............... | H02K 9/06 |
| DE | 10 2015 108 817 A1 | 12/2016 | ................ | F16C 3/00 |
| EP | 0 921 623 A2 | 6/1999 | ............... | B66D 1/12 |
| EP | 1 333 561 A2 | 8/2003 | ............... | H02K 1/20 |
| EP | 2 061 134 A1 | 5/2009 | ............... | H02K 1/27 |
| JP | 62296735 | 12/1987 | ............... | H02K 9/02 |
| JP | 2001008413 A * | 1/2001 | | |
| WO | 2007/031381 A1 | 3/2007 | ............... | H02K 1/32 |
| WO | 2018/108968 A1 | 6/2018 | ............... | H02K 1/27 |

OTHER PUBLICATIONS

See attached translated version of foreign patent JP-2001008413-A. (Year: 2001).*
Received search history from EIC 2800 searcher Angela Brooks on Jun. 25, 2021. (Year: 2021).*
Chinese Office Action, Application No. 201780072770.9, 6 pages, dated Aug. 3, 2020.
German Office Action, Application No. 10 2016 225 180.5, 7 pages, dated Nov. 28, 2017.
International Search Report and Written Opinion, Application No. PCT/EP2017/082526, 19 pages, dated Mar. 22, 2018.

* cited by examiner

ELECTRIC MACHINE AND ROTOR WITH COOLING CHANNEL

CROSS-REFERENCE TO RELATED APPLICATIONS

This application is a U.S. National Stage Application of International Application No. PCT/EP2017/082526 filed Dec. 13, 2017, which designates the United States of America, and claims priority to DE Application No. 10 2016 225 180.5 filed Dec. 15, 2016, the contents of which are hereby incorporated by reference in their entirety.

TECHNICAL FIELD

The present disclosure relates to electric machines. Various embodiments may include rotors for an electric machine.

BACKGROUND

In electric machines of all power classes, a considerable amount of heat is generated, which, with regard to improved machine efficiency and with regard to a longer service life of the electric machine, must be dissipated by means of cooling technology measures. The rotor normally generates heat losses, which are partially transmitted by heat conduction and radiation across an air gap between the rotor and a stator of the electric machine and are released from there to a housing of the electric machine. A further part of the heat losses may be conducted to the outside via the rotor shaft, as a result of which the rolling bearings of the rotor shaft warm up.

Such thermal bearing loading and a temperature difference that arises between inner ring and outer ring leads to high contact stresses in the bearing, which impedes a rolling movement and can result in peel loading and material fatigue. Additionally, as a result of such thermal bearing loading, the lubricant of the rolling bearings is thermally aged, broken down, or burned, and these change its initially set characteristics. All of this leads to a considerable reduction of the service life of the rolling bearings.

In many usage situations, for example in electric motors, in which the rotor temperature is higher than the temperature of the bearing receptacles in the housing of the electric machine, an operating temperature of the outer rings lies below the temperature of the inner rings. This leads to a reduction of the bearing play, which, in the event of an excessive decrease, causes a high preload in the bearings. This undesired additional loading of the bearing that occurs during operation impedes the defined rolling of the rolling body and leads to peel loading and material fatigue, which can lead to premature failure of the bearings and thus of the electric machine as a whole. If bearings with a greater bearing play than normal are used in order to compensate this thermal change in operating play, this can have adverse effects on the electric machine, inter alia increased vibrations and greater axial tolerances of the rotor shaft, which has an adverse effect on the operating characteristics of the motor.

If cooling of the rotor shaft or of the laminated rotor core is possible, this can have direct positive effects on the operating characteristics of the electric machine and on the service life of the bearing arrangement. Cooling of the laminated rotor core may also make a major contribution to the cooling of the rotor shaft. By means of cooling of the rotor shaft, a reduction of the large temperature differences between the inner ring and the outer ring of the respective bearing can be attained, and thus the service life of the bearings can be lengthened.

DE 10 2009 012 324 A1 describes an electric machine having a rotatable shaft and a rotor connected to the shaft. To improve the cooling of the rotor of the electric machine, the shaft has a cavity which extends in an axial direction of the shaft. The cavity is for receiving a refrigerant. Furthermore, the shaft comprises an evaporator unit, which is arranged within the rotor, and a condenser unit, which is arranged outside the rotor. The condenser unit is provided for condensing the refrigerant. The electric machine permits a dissipation of heat losses of an electric machine by means of a shaft thermosiphon in machines without standard forced air cooling. This electric machine is however very cumbersome and expensive in terms of apparatus.

If an electric machine furthermore has a casing liquid-type cooling arrangement of closed design (encapsulated), the problem may arise that the rotor and the winding heads remain virtually without cooling, whereby the performance of the electric machine is restricted and there is the risk of the bearings of the rotor shaft failing owing to the temperatures.

SUMMARY

The teachings of the present disclosure describe a rotor for an electric machine with a relatively low mass moment of inertia. Cooling of the rotor is made possible, such that an average bearing temperature and a temperature difference between a bearing inner ring and a bearing outer ring can be lowered in order to attain a longer service life and in order to prevent failures owing to material fatigue. For example, some embodiments include a rotor (1) for an electric machine, the rotor (1) comprising a laminated rotor core (6), a filler body (5) composed of an aluminum die-cast alloy, which is cast onto the laminated rotor core (6), a first shaft journal (3) with at least one air inlet opening (19), a second shaft journal (4) with at least one air outlet opening (20), and a ventilation unit (18; 36, 37; 40; 60), wherein the filler body (5) connects the laminated rotor core (6) rotationally conjointly to the first shaft journal (3) and to the second shaft journal (4), the laminated rotor core (6) has a central axial bore (11) which is partially filled by the filler body (5) such that an axial cooling channel (16) for cooling air is formed within the central bore (11) of the laminated rotor core (6), the shaft journals (3, 4) drive the ventilation unit (18; 36, 37; 40; 60), and the ventilation unit (18; 36, 37; 40; 60) is designed to draw an air stream in via the air inlet opening (19), convey said air stream through the axial cooling channel (16), and discharge said air stream via the air outlet opening (20).

In some embodiments, the rotor (1) is suitable for an electric machine in the form of a synchronous motor, the laminated rotor core (6) forms receiving channels (28) within which permanent magnets (29) are received, and free spaces between the permanent magnets (29) and the receiving channels (28) are filled by the filler body (5) such that the permanent magnets (29) are fixed within the receiving channels (28) by means of the filler body (5).

In some embodiments, the rotor (1) is suitable for an electric machine in the form of an asynchronous motor, the rotor (1) furthermore comprising a first short-circuiting ring (31) composed of an aluminum die-cast alloy, which is cast onto the laminated rotor core (6), a second short-circuiting ring (32) composed of an aluminum die-cast alloy, which is cast onto the laminated rotor core (6), and multiple short-circuiting bars (33) composed of an aluminum die-cast alloy, which is cast into axial grooves (34) of an outer shell surface (35) of the laminated rotor core (6) such that the short-circuiting bars (33) are connected in each case to the first short-circuiting ring (31) and to the second short-circuiting ring (32).

In some embodiments, the ventilation unit (18) comprises a conveying spiral (18), a drive shaft (21) of the conveying spiral (18) is mounted rotationally conjointly within the first shaft journal (3) and the second shaft journal (4), and the conveying spiral (18) is arranged within the axial cooling channel (16).

In some embodiments, the ventilation unit (36, 37) comprises fan impeller blades (36, 37) which are integrated into the shaft journals.

In some embodiments, the ventilation unit (40) comprises an axial fan impeller insert (40), the axial fan impeller insert (40) is connected rotationally conjointly in positively locking fashion to the filler body (5), and the axial fan impeller insert (40) is arranged within the axial cooling channel (16).

In some embodiments, multiple fin-like first projections (17) project radially inward from an inner shell surface (9) of the filler body (5), and wherein the shaft journals (3, 4) are fastened by fastening means (27) to second fin-like projections (22) of the filler body (5), wherein the second fin-like projections (22) likewise project radially inward from the inner shell surface (15) of the main body (5).

In some embodiments, an inner shell surface (9) of the filler body (5) forms in each case one centering shoulder (9a, 9b) for the first shaft journal (3) and for the second shaft journal (4).

In some embodiments, the laminated rotor core (6) is connected to the filler body (5) in positively locking and non-positively locking fashion in the axial direction (L).

As another example, some embodiments include an electric machine (42) for a vehicle, the electric machine (42) comprising: a rotor (1) as described above, wherein the rotor (1) has a rotor shaft (2) mounted in two rolling bearings (45, 46), a stator (48) having a laminated stator core (49) and having stator winding heads (50, 51) which are arranged at opposite end sides of the laminated stator core (49), and a housing (43) which surrounds the stator (48) in a radial direction, wherein the stator (48) and the housing (43) form, between them, an outer cooling channel (52) which runs along the laminated stator core (49) and the stator winding heads (50, 51) and which connects two opposite end sides of the stator winding heads (50, 51) to one another, the ventilation unit (60) of the rotor (1) is designed to form a suction side (62) on a first end side of the laminated rotor core (6) of the rotor (1), and a pressure side (61) on a second end side of the laminated rotor core (6), as the rotor shaft (2) rotates, such that air is drawn in on the suction side (62) and conveyed through the axial cooling channel (60) of the rotor (1) and the outer cooling channel (52), and the housing (43) comprises a liquid cooling channel (55) of a circulation cooling circuit (53), within which a cooling liquid circulates and cools the housing (43).

BRIEF DESCRIPTION OF THE DRAWINGS

Exemplary embodiments incorporating teachings herein will be discussed in more detail below on the basis of the schematic drawing, where identical or similar elements are denoted by the same reference designations. In the drawings.

DETAILED DESCRIPTION

Figure 1:
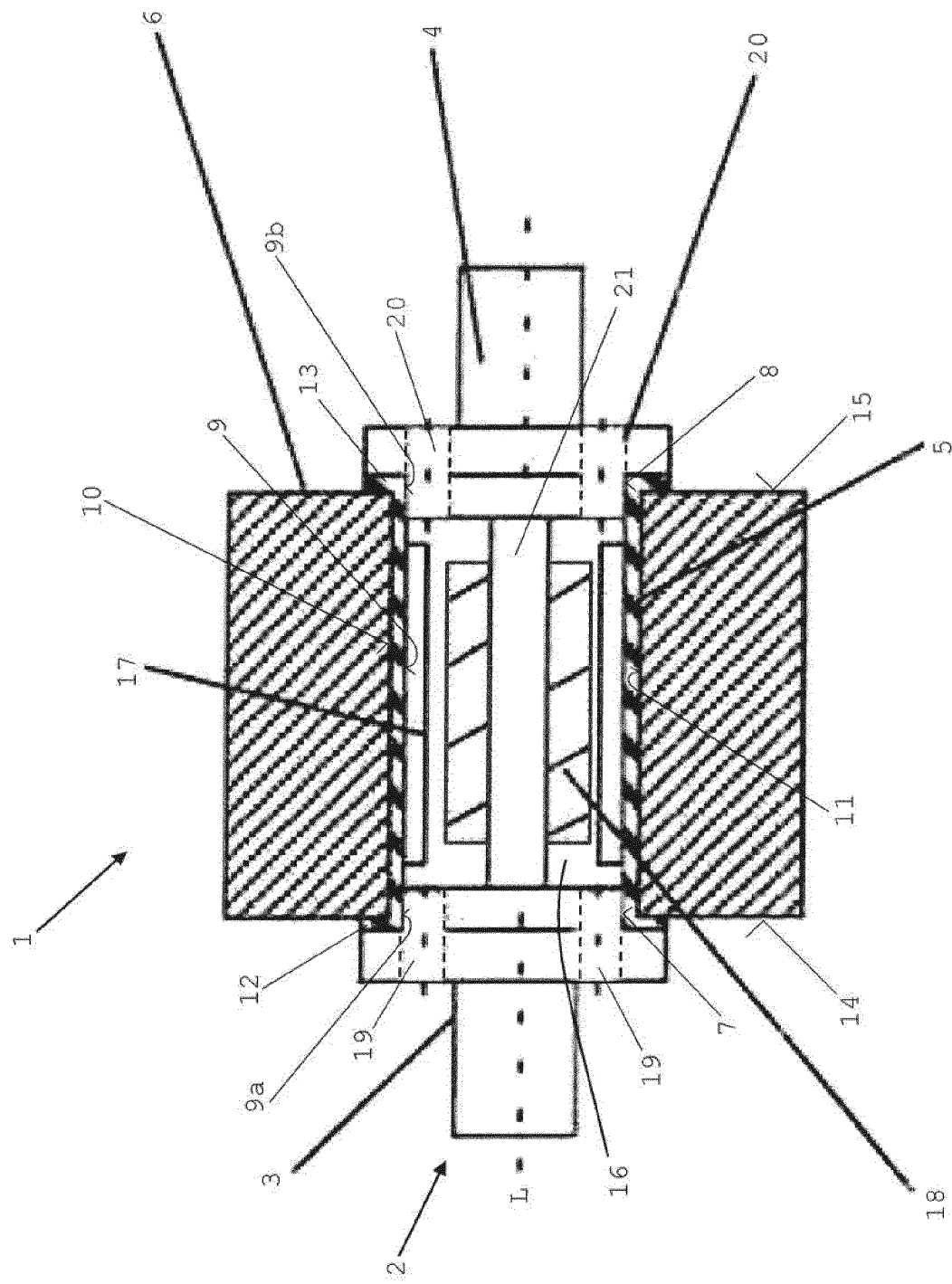
FIG. 1 is a longitudinal sectional illustration of an exemplary embodiment of a rotor incorporating the teachings of the present disclosure.

In some embodiments, a rotor for an electric machine comprises a laminated rotor core, a filler body composed of an aluminum die-cast alloy, which is cast onto the laminated rotor core, a first shaft journal with at least one air inlet opening, a second shaft journal with at least one air outlet opening, and a ventilation unit. The filler body connects the laminated rotor core rotationally conjointly to the first shaft journal and to the second shaft journal. The laminated rotor core has a central axial bore which is partially filled by the filler body such that an axial cooling channel for cooling air is formed within the central bore of the laminated rotor core. The shaft journals furthermore drive the ventilation unit, and the ventilation unit is designed to draw an air stream in via the air inlet opening, convey said air stream through the axial cooling channel, and discharge said air stream via the air outlet opening.

In some embodiments, the axial cooling channel and the ventilation unit permit active open-circuit ventilation of the rotor, wherein a circulating air stream or an aerosol stream can be generated which is in particular guided along within the rotor and can also cool winding head spaces of an electric machine within which the rotor may be installed.

In some embodiments, the filler body transmits torques between the shaft journals and the laminated rotor core. To this end, the filler body may be cast onto the laminated rotor core in such a way that the filler body is connected to the laminated rotor core in positively locking fashion. Furthermore, the shaft journals may be connected to the filler body in positively locking and non-positively locking fashion. In this way, a shaft-hub connection can be realized by positive locking and non-positive locking of the shaft journals by means of the cast-on filler bodies. It is furthermore advantageous that a continuous shaft can be dispensed with, and instead a transmissible torque can be ensured by means of the two shaft journals.

In vehicle drives in which the rotational and translational masses of the electric motors substantially determine the energy requirement and therefore the battery size, it is necessary to keep the masses as low as possible. That is to say that the rotor of the electric machine should be equipped with a mass moment of inertia which is as low as possible.

The rotors described herein may be distinguished by a particularly low rotational mass moment of inertia. The particularly low weight of the rotor is of value for the drive efficiency since the squirrel-cage rotor is a rotating component; this is because the rotational mass moment of inertia of the rotor can be lowered by at least 10% with this design. This factor provides important advantages in respect of efficiency for the operating behavior. To achieve this, the rotor may have an architecture with which the laminated core cross section can be limited to an actively magnetic flux-directing laminated core cross section, as a result of which a significant reduction in the weight of the squirrel-cage rotor and a reduction in the mass moment of inertia of said squirrel-cage rotor are possible. In this case, a diameter of the central axial bore within the laminated rotor core may be selected to be particularly large. However, an active filler material of a lamination blank between a rotor shaft and active lamination material of the laminated rotor core can be dispensed with.

In some embodiments, for example in the case of short-circuiting rings and short-circuiting bars being cast onto the laminated rotor core of a rotor for an asynchronous motor, the region of the formerly inactive lamination zone can also be at least partially filled with a melt, in particular with a light-metal alloy, for example with a die-cast aluminum alloy, as a result of which the filler body is formed. By contrast, in the case of synchronous motors, by means of an aluminum die-casting process, the filler body can be cast on and, at the same time, permanent magnets can be fixed. Here, for the fixing of the permanent magnets, special channels may be provided in the lamination of the core. It is likewise possible in the case of synchronous motors for a rotor carrier to be arranged (extruded profile) in the region of the formerly inactive lamination zone.

In some embodiments, the rotor is suitable for an electric machine in the form of a synchronous motor. Here, the laminated rotor core forms receiving channels within which permanent magnets are received, wherein free spaces between the permanent magnets and the receiving channels are filled by the filler body such that the permanent magnets are fixed within the receiving channels by means of the filler body.

In some embodiments, the rotor is suitable for an electric machine in the form of an asynchronous motor. Here, the rotor furthermore comprises a first short-circuiting ring, a second short-circuiting ring and multiple short-circuiting bars. The first short-circuiting ring is composed of an aluminum die-cast alloy, which is cast onto the laminated rotor core. The second short-circuiting ring is likewise composed of an aluminum die-cast alloy, which is cast onto the laminated rotor core. Furthermore, the multiple short-circuiting bars are composed of an aluminum die-cast alloy, which is cast into axial grooves of an outer shell surface of the laminated rotor core such that the short-circuiting bars are connected in each case to the first short-circuiting ring and to the second short-circuiting ring.

In some embodiments, a laminated rotor core can be stacked, wherein the laminated rotor core is provided with cavities or grooves for the short-circuiting bars. The grooves in the laminated rotor core form channels, wherein a die-casting device can be placed at an end of the laminated rotor core and the channels can be filled with a melt of the aluminum die-cast alloy, for example through a passage (in the die-casting device), wherein the channels filled with solidified melt form the short-circuiting bars of the squirrel-cage rotor.

In some embodiments, the casting-on of the aluminium die-cast alloy may be performed such that the short-circuiting bars and the short-circuiting rings are not mechanically and electrically connected to the filler body. The aluminum die-cast alloy which is used for producing the short-circuiting bars may be furthermore the same aluminum die-cast alloy as is used for producing the first short-circuiting ring and the second short-circuiting ring and for producing the filler body. In addition to the general advantages which accompany die-casting, such embodiments permit a high degree of functional integration, that is to say the production of a positively locking and non-positively locking connection to the shaft journals and also the reduction in weight and reduction in costs in the production of the hybrid components of the rotor. In particular, a reduction in costs is provided owing to the possibility of producing the individual elements of the rotor in segmented design so as to optimize costs.

In some embodiments, the ventilation unit comprises a conveying spiral, wherein a drive shaft of the conveying spiral is mounted rotationally conjointly within the first shaft journal and within the second shaft journal, and the conveying spiral is arranged within the axial cooling channel. Furthermore, the ventilation unit may comprise fan impeller blades integrated into the shaft journals.

In some embodiments, the ventilation unit may comprise an axial fan impeller insert, wherein the axial fan impeller insert is connected rotationally conjointly in positively locking fashion to the filler body, and the axial fan impeller insert is arranged within the axial cooling channel.

In some embodiments, multiple fin-like first projections project radially inward from an inner shell surface of the filler body, whereby the shaft journals are fastened by fastening means to fin-like second projections of the filler body, wherein the second fin-like projections likewise project radially inward from the inner shell surface of the main body. The first projections may serve as cooling fins with an increased heat transfer area and may contribute to improved cooling of the rotor carrier and thus also of the lightweight rotor. The second projections may be wider in cross section than the first projections, in order to permit a particularly durable fastening of the filler body to the shaft journals. Furthermore, the second projections are arranged in a circumferential direction between the first projections, which is particularly space-saving.

In some embodiments, the inner shell surface of the filler body may form in each case one centering shoulder for the first shaft journal and for the second shaft journal. The centering shoulders permit a particularly straightforward orientation of the shaft journals on the filler body, whereby the assembly of the rotor is facilitated.

In some embodiments, the laminated rotor core may be connected to the filler body in positively locking and non-positively locking fashion in the axial direction. In some embodiments, the filler body may perform a clamp function for the individual laminations of the laminated rotor core. In particular, the filler body may be cast onto the laminated rotor core in such a way that the laminated rotor core is accommodated in a circumferential recess in the filler body, wherein end portions of the filler body which delimit the recess prevent displacement of the laminated rotor core in the axial direction and may hold together/clamp the laminated rotor core in non-positively locking fashion in the axial direction.

In some embodiments, an electric machine comprises a rotor as described above with a rotor shaft mounted in two rolling bearings, said rotor shaft having a first shaft journal and having a second shaft journal. Furthermore, the electric machine comprises a stator, with a laminated stator core and with stator winding heads which are arranged at opposite end sides of the laminated stator core, and a housing, which surrounds the stator in a radial direction. The stator and the housing form, between them, at least one outer cooling channel which runs along the laminated stator core and the stator winding heads and which connects two opposite end sides of the stator winding heads to one another. Here, the ventilation unit of the rotor forms a suction side on a first end side of the laminated rotor core of the rotor, and a pressure side on a second end side of the laminated rotor core, as the rotor shaft rotates, such that air is drawn in on the suction side and conveyed through the axial cooling channel of the rotor and the outer cooling channel. Furthermore, the housing comprises a liquid cooling channel of a circulation cooling circuit, within which a cooling liquid circulates and cools the housing.

The electric machine may include a rotor which is subjected to active open-circuit ventilation with air and to provide an indirect connection of a corresponding rotor cooling arrangement to a liquid-cooled housing, in order to thereby permit an improvement in the cooling of the rotor, of the winding heads and in particular of the rolling bearings of the rotor. In other words, it is proposed that winding head spaces be led to or connected to a liquid-type cooling arrangement of the housing, and that a circulating air stream be generated within the rotor and within the winding head spaces. In this way, an average bearing temperature and a temperature difference between a bearing in an inner ring and an outer ring of the rolling bearings of the rotor can be lowered such that a longer service life of the rolling bearings is attained, and failures resulting from material fatigue are avoided. To provide the open-circuit ventilation, the rotor comprises in particular the ventilation unit described further above in conjunction with the rotor according to the invention.

Here, the stator and the housing form, between them, one or more outer cooling channels which run(s) along the laminated stator core and the winding heads and which connect(s) two opposite end sides of the stator winding heads to one another. The at least one outer cooling channel may be delimited in a radial direction by an outer shell surface of the stator at one side and by an inner wall, situated opposite the shell surface, of the housing at the other side. In other words, the outer cooling channel may be formed by an intermediate space between housing, stator and stator winding heads. In an axial direction, that is to say in a longitudinal direction of the stator, the outer cooling channel extends along the entire stator and the stator winding heads. Furthermore, the outer cooling channel may run in spiral fashion along the entire circumference of the stator.

The ventilation unit is designed to form a suction side on a first end side of the laminated rotor core, and a pressure side on a second end side of the laminated rotor core, as the rotor or laminated rotor core rotates, such that air is drawn in on the suction side from the at least one cooling channel and conveyed through the axial cooling channel of the rotor and the outer cooling channel or the outer cooling channels, wherein the stator winding heads are passed and cooled.

The circulation cooling circuit may have a pump and a heat exchanger for cooling the cooling liquid. The pump may draw in the cooling liquid from the region of the liquid cooling channel of the housing and convey said cooling liquid through the heat exchanger, where said cooling liquid is cooled by means of a second cooling medium, for example by means of cooling water of a main cooling circuit, and subsequently convey said cooling liquid back into the liquid cooling channel of the housing.

FIG. 1 shows a rotor 1 with a rotor shaft 2, wherein the rotor shaft 2 comprises a first shaft journal 3 and a second shaft journal 4. The rotor 1 furthermore comprises a cast filling or filler body 5 composed of an aluminum die-cast alloy and a laminated rotor core 6. The filler body 5 is cast onto the laminated rotor core 6 and connected to the laminated rotor core 6, for example in positively locking fashion, such that the filler body 5 and the laminated rotor core 6 are connected rotationally conjointly to one another. Therefore, a torque can be transmitted from the filler body 5 to the laminated rotor core 6, and vice versa. In particular, a rotational movement of the filler body 5 about a longitudinal axis L of the rotor 1 can be transmitted to the laminated rotor core 6, so that the laminated rotor core 6 also rotates about the longitudinal axis L.

The filler body 5 is substantially of cylindrical configuration and has an annular cross section. The first shaft journal 3 has a first centering collar 7 at its end illustrated on the right in FIG. 1, and the second shaft journal 4 has a second centering collar 8 at its end illustrated on the left in FIG. 1. An inner shell surface 9 of the filler body 5 forms, in its axial end regions, in each case one centering shoulder 9a, 9b for the first centering collar 7 of the first shaft journal and for the second centering collar 8 of the second shaft journal 4. The first centering collar 7 is inserted into the first centering shoulder 9a, and the second centering collar 8 is inserted into the second centering shoulder 9b. In this way, the shaft journals 3, 4 are oriented with respect to the filler body 5, wherein a longitudinal axis L of the shaft journals 3, 4 corresponds to a longitudinal axis L of the filler body 5.

The filler body 5 forms, on its outer circumference, a recess 10 which extends over a large region of the outer circumference. The filler body 5 is cast onto the laminated rotor core 6, such that the recess 10 of the filler body corresponds to a central bore 11 of the laminated rotor core 6. The recess 10 is delimited in the longitudinal direction L by two radially running end portions 12 and 13. The laminated rotor core 6 has a first end side 14 illustrated on the left in FIG. 1 and has a second end side 15 illustrated on the right in FIG. 1. The filler body 5 is, by way of its end portions 12 and 13, cast onto the end sides 14 and 15 of the laminated rotor core 6 in such a way that the individual laminations of the laminated rotor core 6 are pressed axially against one another by the end portions 12 and 13 (non-positive locking), but are at least axially held together (positive locking). In this way, the end portions 12 and 13 can hold together or clamp the laminated rotor core 6, that is to say they perform a kind of "clamp function" for the laminated rotor core 6, which is held together in the longitudinal direction L by the end portions 12 and 13.

The first shaft journal 3 is connected in positively locking fashion and rotationally conjointly to the filler body 5, and the second shaft journal 4 is likewise connected in positively locking fashion and rotationally conjointly to the filler body 5. The connection between the shaft journals 3 and 4 respectively and the filler body 5 can be made for example by means of a screw connection (cf. for example FIGS. 2 and 3). Torques can be transmitted between the shaft journals 3 and 4 and the filler body 5 owing to the rotationally conjoint connection between the filler body 5 and the first shaft journal 3 on the one hand and also the second shaft journal 4 on the other hand. In particular, a rotational movement of the first shaft journal 3 and/or of the second shaft journal 4 can be transmitted to the filler body 5. Rotational movements and torques can also be transmitted from the filler body 5 to the laminated rotor core 6 owing to the rotationally conjoint connection between the filler body 5 and the laminated rotor core 6 (see above). Consequently, rotational movements and torques can be transmitted from the first shaft journal 3 and the second shaft journal 4 to the laminated rotor core 6 via the filler body 5 and vice versa.

The inner shell surface 9 of the filler body defines an axial cooling channel 16 for cooling air, which cooling channel connects opposite end sides of the filler body to one another. Furthermore, multiple cooling fins 17 are provided which are distributed substantially uniformly in a circumferential direction, which project radially inward from the inner shell surface 9 of the filler body 5, and which extend in an axial direction between mutually opposite end sides of the filler body 5.

The length of the cooling fins 17 is dimensioned such that a central region of the cooling channel 16 remains free or is not filled. A conveying spiral 18 for cooling air may be arranged within the non-filled cooling channel. Furthermore, the first shaft journal 3 has multiple air inlet openings 19 for the supply of air in an axial direction L, and the second shaft journal 4 has multiple air outlet openings 20 for the discharge of air in the axial direction L. A central shaft 21 of the conveying spiral 18 is mounted rotationally conjointly within the first shaft journal 3 and within the second shaft journal 4, such that, as the shaft journals 3 and 4 rotate, the conveying spiral 18 also rotates, and cooling air is drawn in in the axial direction via the air inlet opening 19, is conveyed through the axial cooling channel 16 by means of the conveying spiral 18, and is discharged in the axial direction L through the outlet openings 20.

Figure 2:
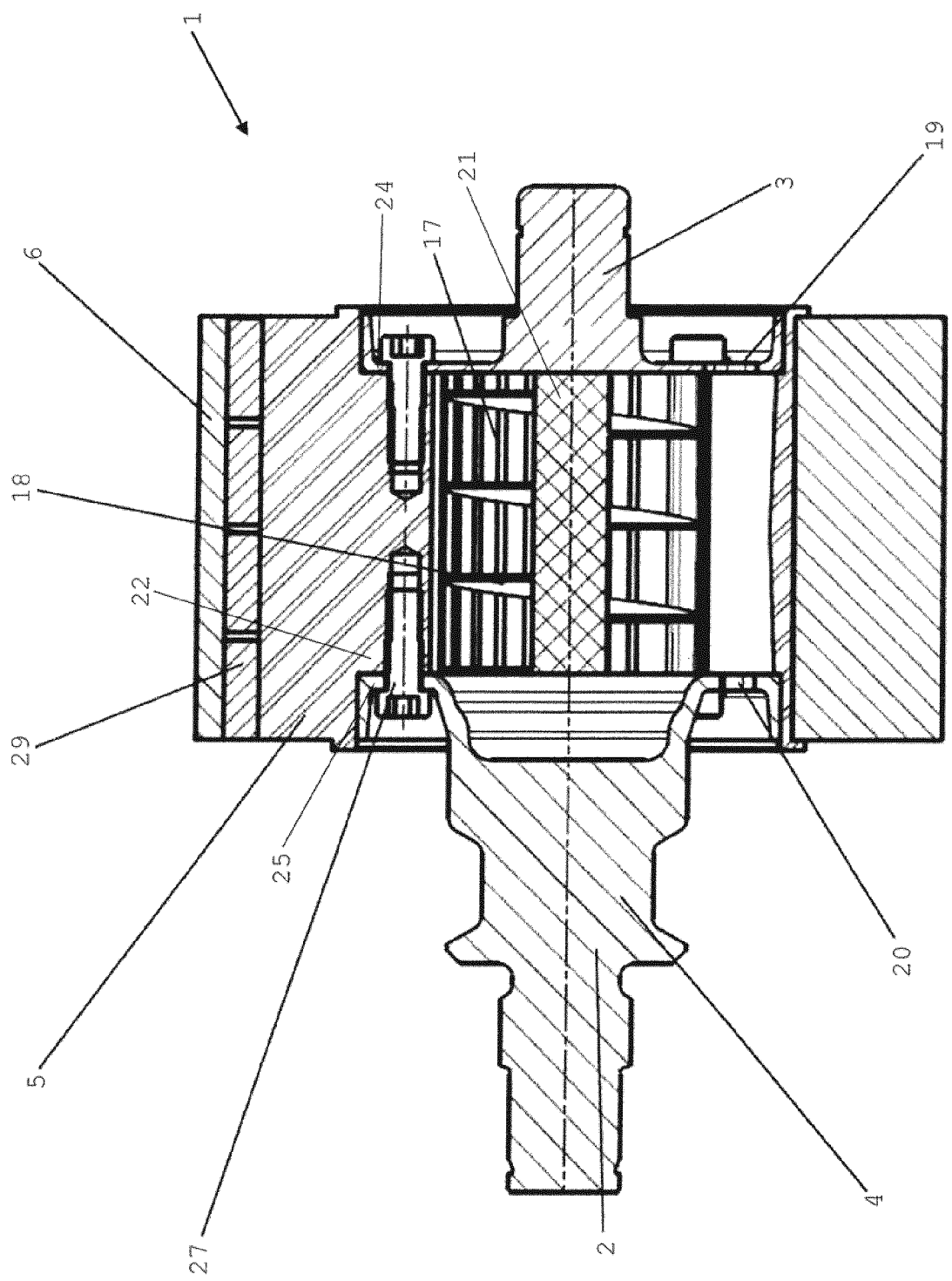
FIG. 2 is a longitudinal three-quarter sectional illustration of a further exemplary embodiment of a rotor incorporating the teachings of the present disclosure for an electric machine in the form of a synchronous motor.
Figure 3:
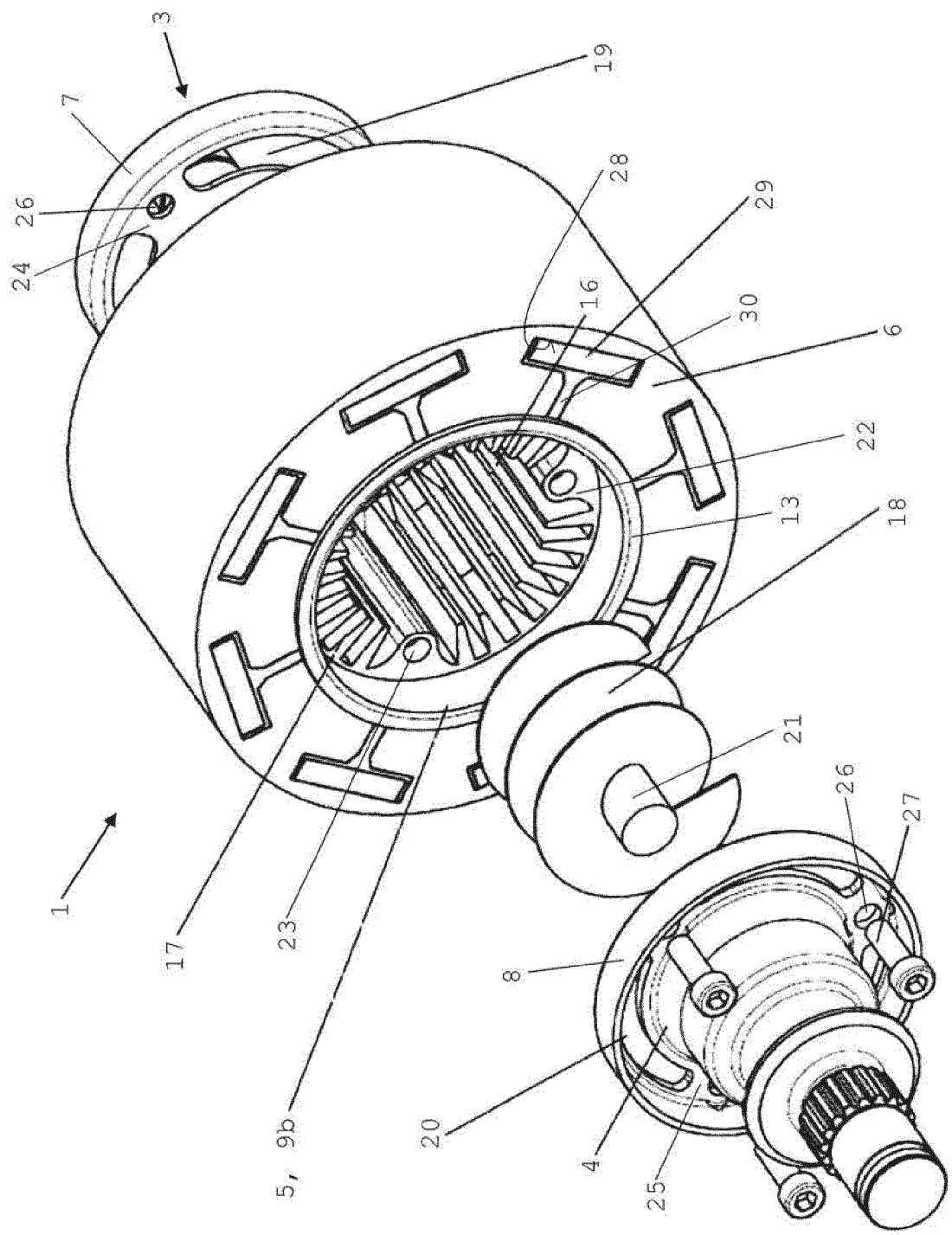
FIG. 3 is a perspective exploded illustration of the rotor as shown in FIG. 2.
Figure 4:
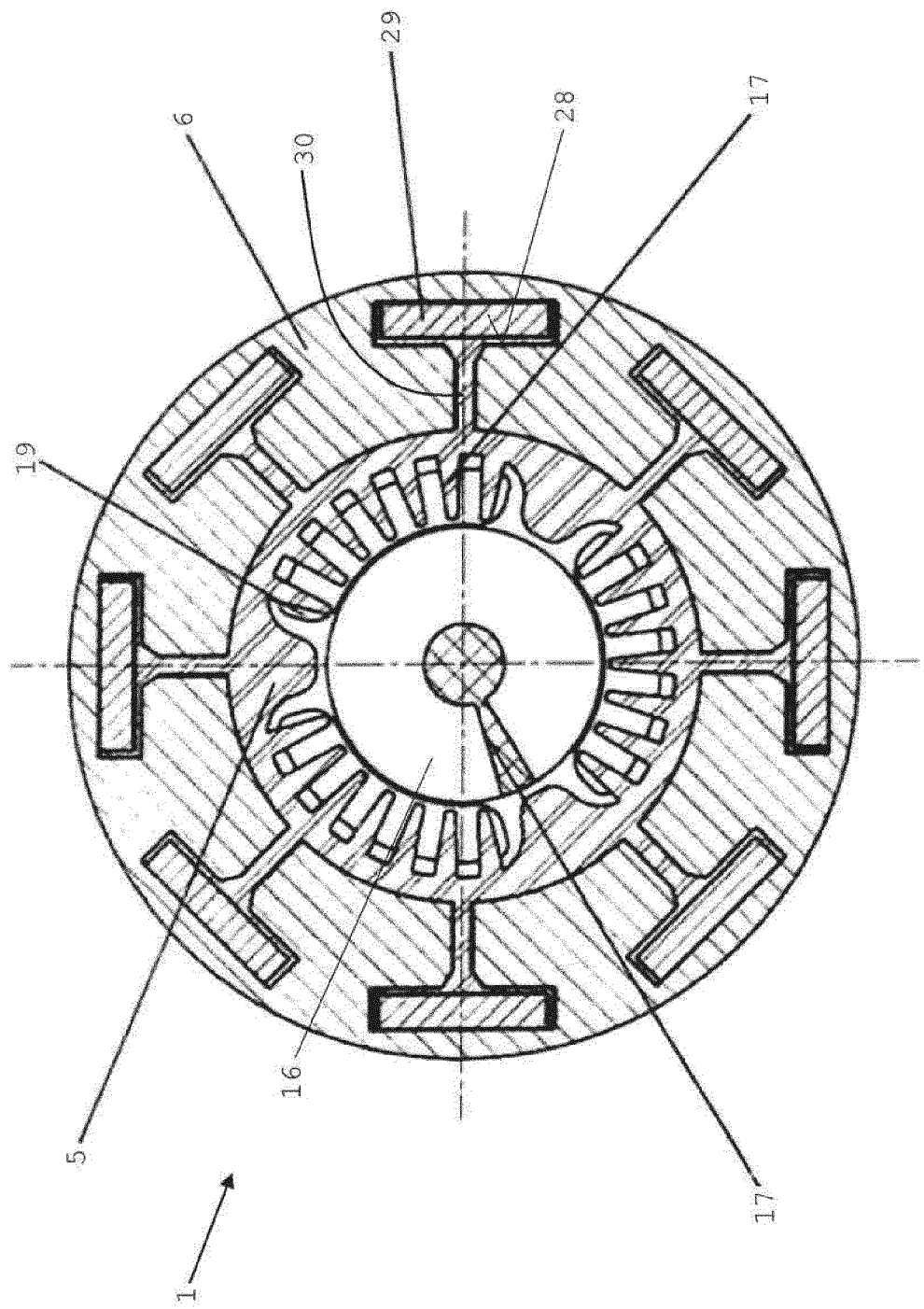
FIG. 4 is a cross-sectional illustration of the rotor as shown in FIG. 2.

FIGS. 2 to 4 show in detail how a rotor 1 incorporating the teachings herein (for example that according to FIG. 1) for a synchronous motor may be designed. It is accordingly possible for multiple fin-like cooling projections 17 to project radially inward from the inner shell surface 9 of the filler body 5. Between the cooling projections 17, there are arranged three fin-like fastening projections 22 which are arranged offset with respect to one another by 120° in the circumferential direction and which likewise project radially inward from the inner shell surface 9 of the filler body 5 and each have a threaded bore 23. The shaft journals 3, 4 have in each case one fastening flange 24, 25 with three bores 26 arranged offset with respect to one another by 120° in the circumferential direction. By means of in each case three screws 27, the connecting flanges 24, 25 of the shaft journals 3, 4 are screwed together with the fin-like fastening projections 22 of the filler body 5.

The laminated rotor core 6 may furthermore form receiving channels 28 within which permanent magnets 29 are received, wherein free spaces between the permanent magnets 29 and the receiving channels 28 are filled by the aluminum die-cast alloy of the filler body 5 such that the permanent magnets 29 are fixed within the receiving channels 28 by means of the filler body 5. As can be seen in particular in FIGS. 3 and 4, each of the receiving channels 28 is connected by means of a connecting channel 30 to the rest of the filler body 5. The connecting channels 30 thus serve, during the casting of the filler body 5 onto the laminated rotor core 6, for being able to conduct liquid aluminum die-cast alloy into the receiving channels 28 equipped with the permanent magnets 29.

Figure 5:
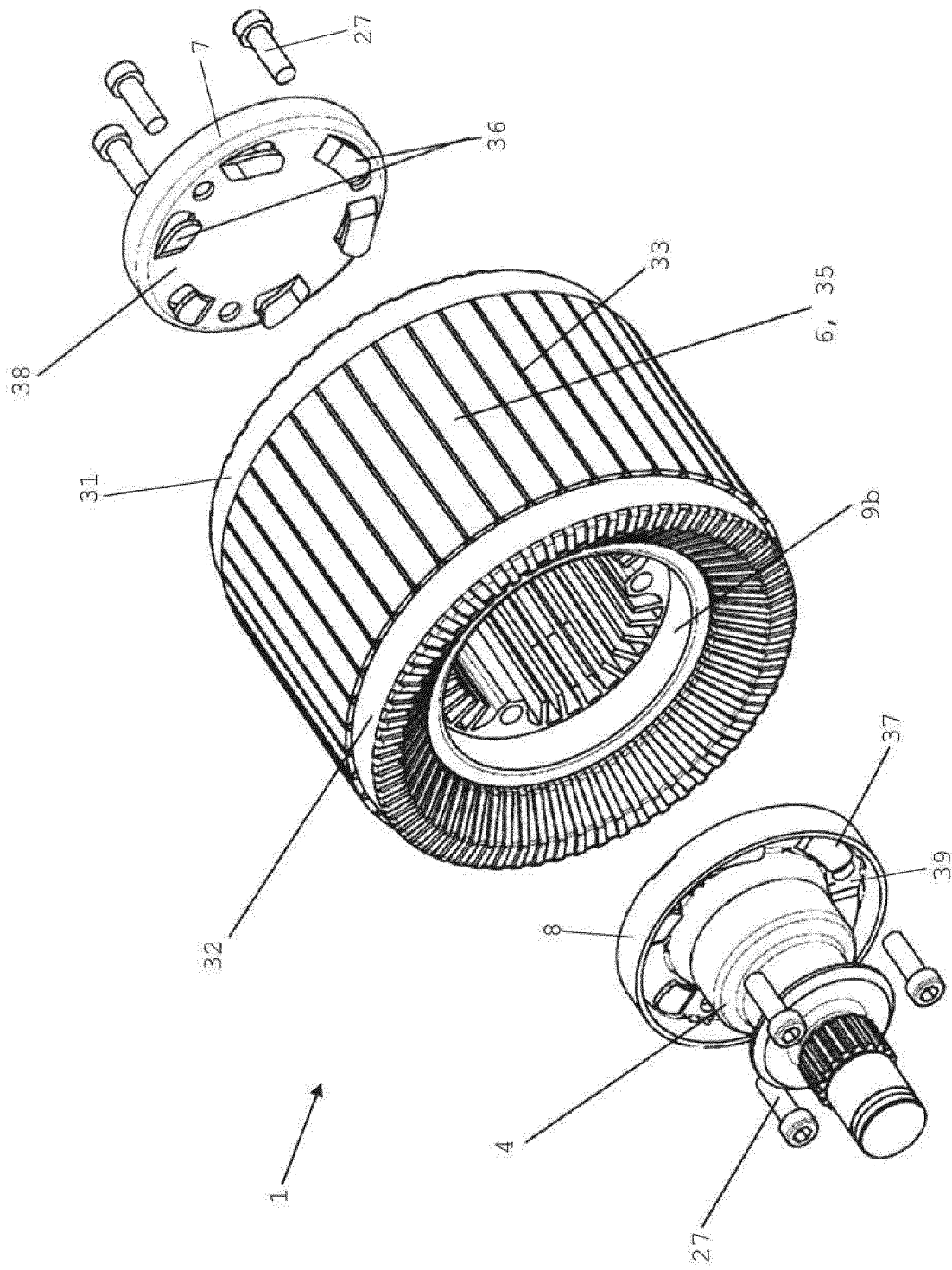
FIG. 5 is a perspective exploded illustration of a further exemplary embodiment of a rotor incorporating the teachings of the present disclosure for an electric machine in the form of an asynchronous motor.
Figure 6:
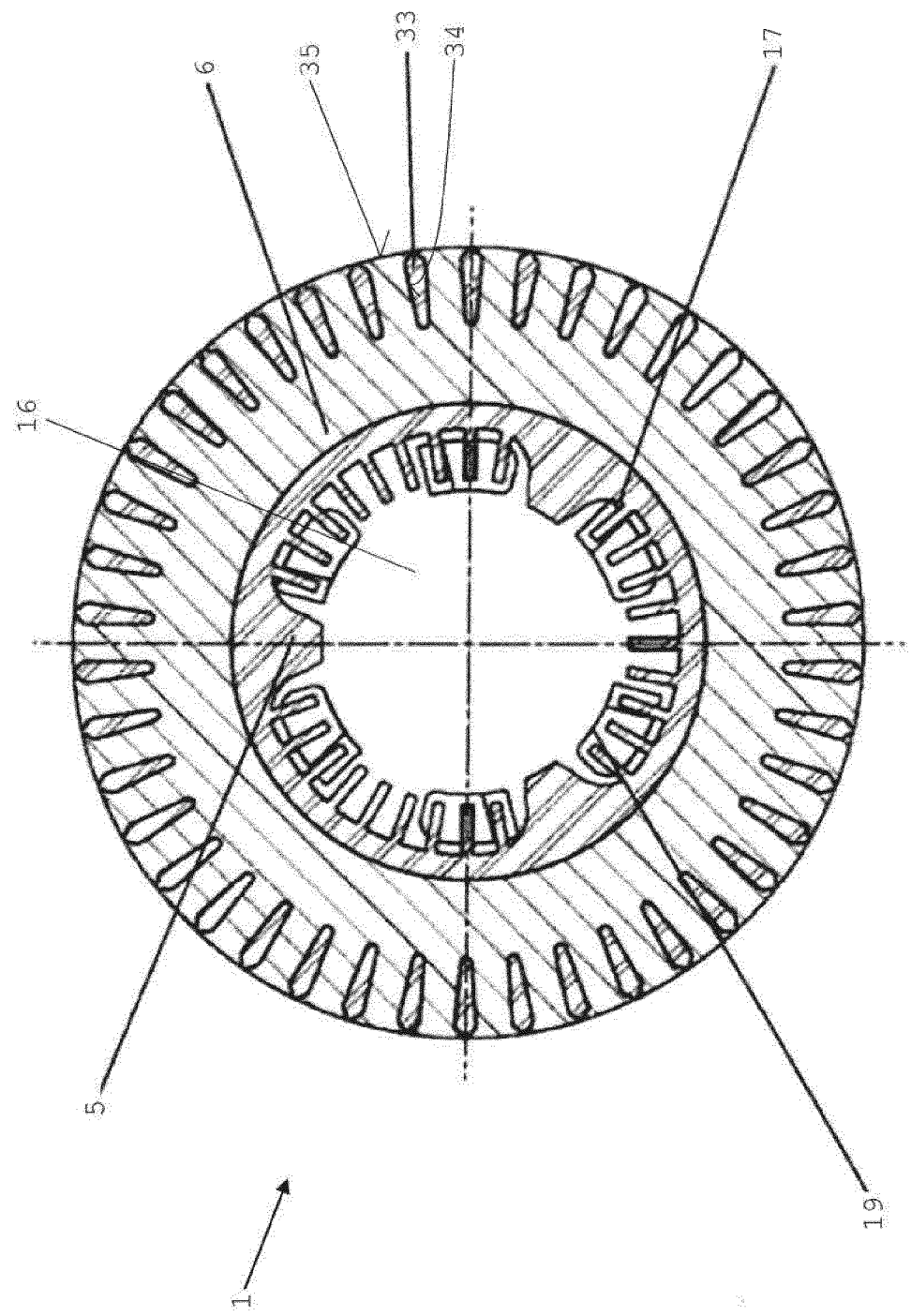
FIG. 6 is a cross-sectional illustration of the rotor as shown in FIG. 5.

FIGS. 5 and 6 show a further rotor 1 incorporating the teachings herein, which is suitable for being used in an asynchronous motor. The rotor 1 comprises a first short-circuiting ring 31, a second short-circuiting ring 32 and multiple short-circuiting bars 33. The first short-circuiting ring 31 is composed of an aluminum die-cast alloy, which is cast onto a first end side of the laminated rotor core 6. The second short-circuiting ring 32 is likewise composed of an aluminum die-cast alloy, which is cast onto a second end side of the laminated rotor core 6. Furthermore, the multiple short-circuiting bars 33 are composed of an aluminum die-cast alloy, which is cast into axial grooves 34 of an outer shell surface 35 of the laminated rotor core 6 such that the short-circuiting bars 33 are connected in each case to the first short-circuiting ring 31 and to the second short-circuiting ring 32.

In this case, the casting-on of the aluminum die-cast alloy may be performed such that the short-circuiting bars 33 and the short-circuiting rings 31, 32 are not mechanically and electrically connected to the filler body 5. The aluminum die-cast alloy which is used for producing the short-circuiting bars 33 is furthermore, in the exemplary embodiment shown in FIGS. 5 and 6, the same aluminum die-cast alloy as is used for producing the first short-circuiting ring 31 and the second short-circuiting ring 32 and for producing the filler body 5.

Furthermore, in each case six fan impeller blades 36, 37 which are distributed in a circumferential direction are integrated into the shaft journals 3, 4. First fan impeller blades 36 of the first shaft journal project from a first end side 38 of the first shaft journal 3 and project into the axial cooling channel 16 within the filler body 5, wherein the first fan impeller blades 36 are, in a flow direction, arranged in each case downstream of one of the air inlet openings 19. Second fan impeller blades 37 of the second shaft journal 4 project from a second end side 39 of the second shaft journal 4 but do not project into the axial cooling channel 16 within the filler body 5, and are instead oriented away from the axial cooling channel 16, wherein the second fan impeller blades 37 are, in the flow direction, arranged in each case downstream of one of the air outlet openings 20.

If the shaft journals 3 and 4 rotate, the fan impeller blades 36, also rotate, whereby cooling air is drawn in in an axial direction via the air inlet opening 19 by means of the first fan impeller blades 36, is conveyed through the axial cooling channel 16, and is discharged, or drawn out, through the outlet openings 20 in the axial direction L by means of the second fan impeller blades 37.

Figure 7:
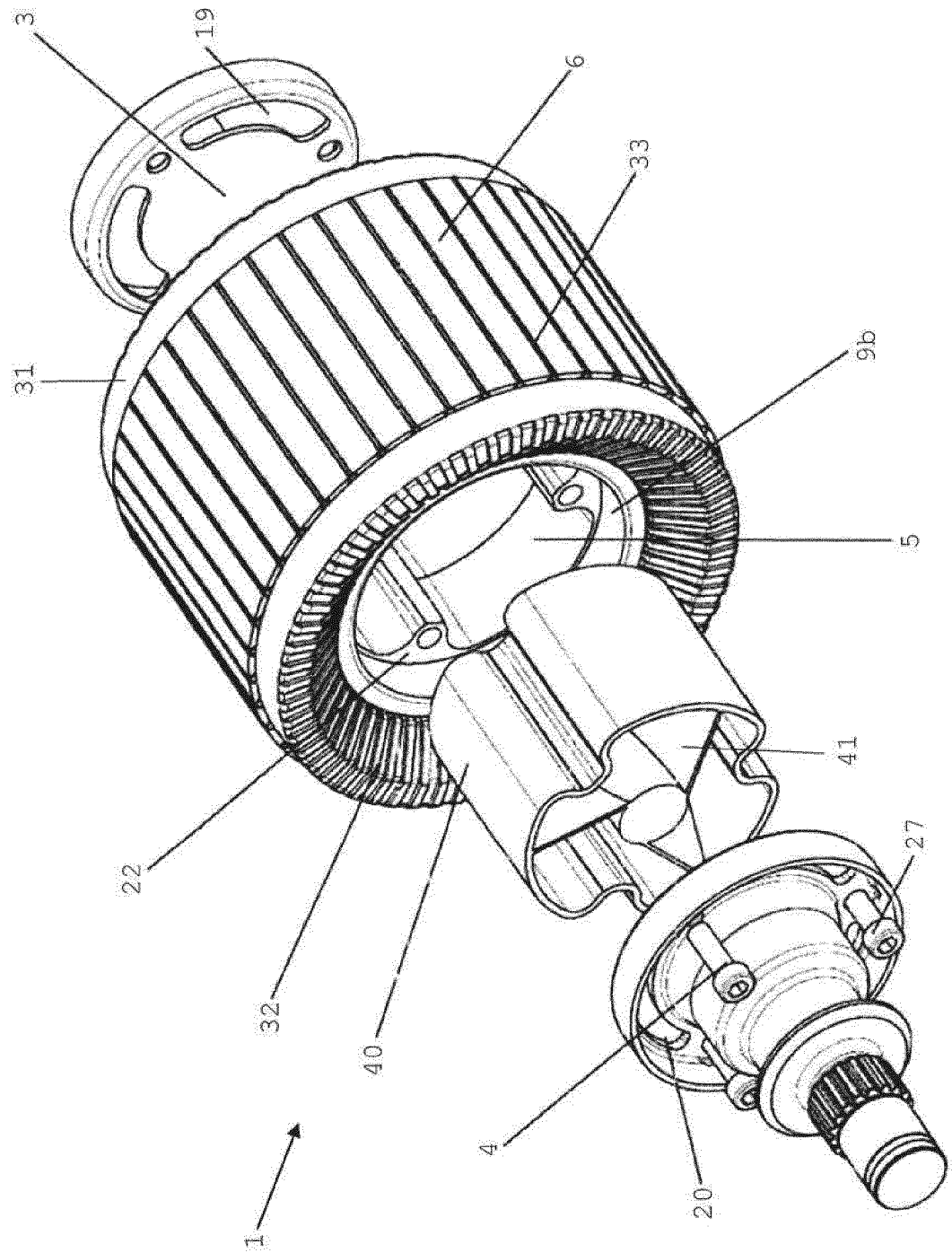
FIG. 7 is a perspective exploded illustration of a further exemplary embodiment of a rotor incorporating the teachings of the present disclosure for an electric machine in the form of an asynchronous motor.
Figure 8:
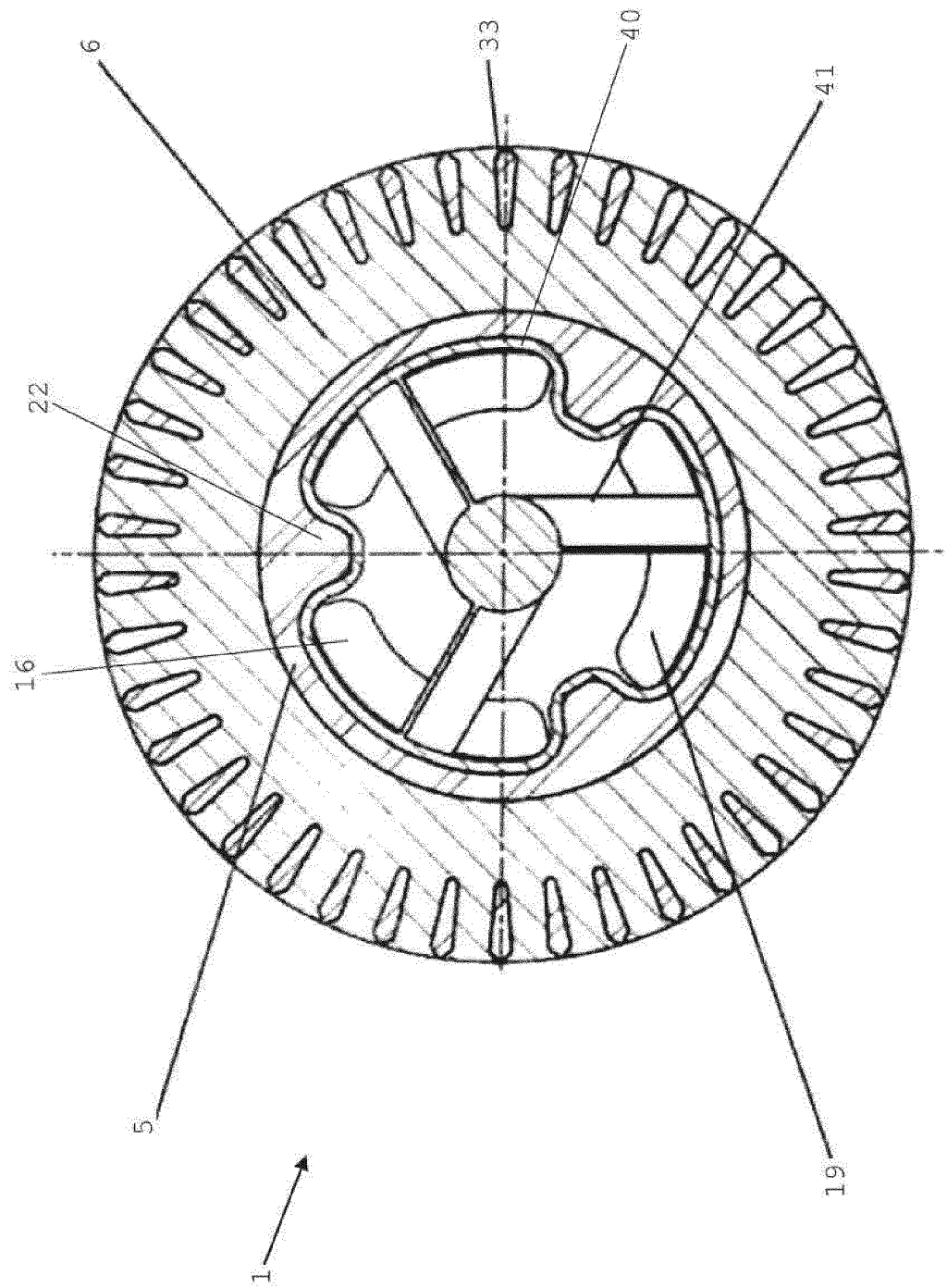
FIG. 8 is a cross-sectional illustration of the rotor as shown in FIG. 7.

FIGS. 7 and 8 show a further rotor 1, which is suitable for being used in an asynchronous motor. The rotor 1 as per FIGS. 7 and 8 differs from the rotor as per FIGS. 5 and 6 in particular by the design of the ventilation unit and of the cooling fins. In the exemplary embodiment shown in FIGS. 7 and 8, the ventilation unit comprises an axial fan impeller insert 40 with three blades 41, wherein the axial fan impeller insert 40 is connected rotationally conjointly in positively locking fashion to the fin-like fastening projections 22 of the filler body 5, wherein the axial fan impeller insert 40 is arranged within the axial cooling channel 16. Here, an outer circumferential form of the axial fan impeller insert 40 corresponds to the fin-like fastening projections 22 of the filler body 5, wherein no fin-like cooling fins project radially inward from the inner shell surface 9 of the filler body 5 (as shown by the exemplary embodiments in FIGS. 2 to 6).

Figure 9:
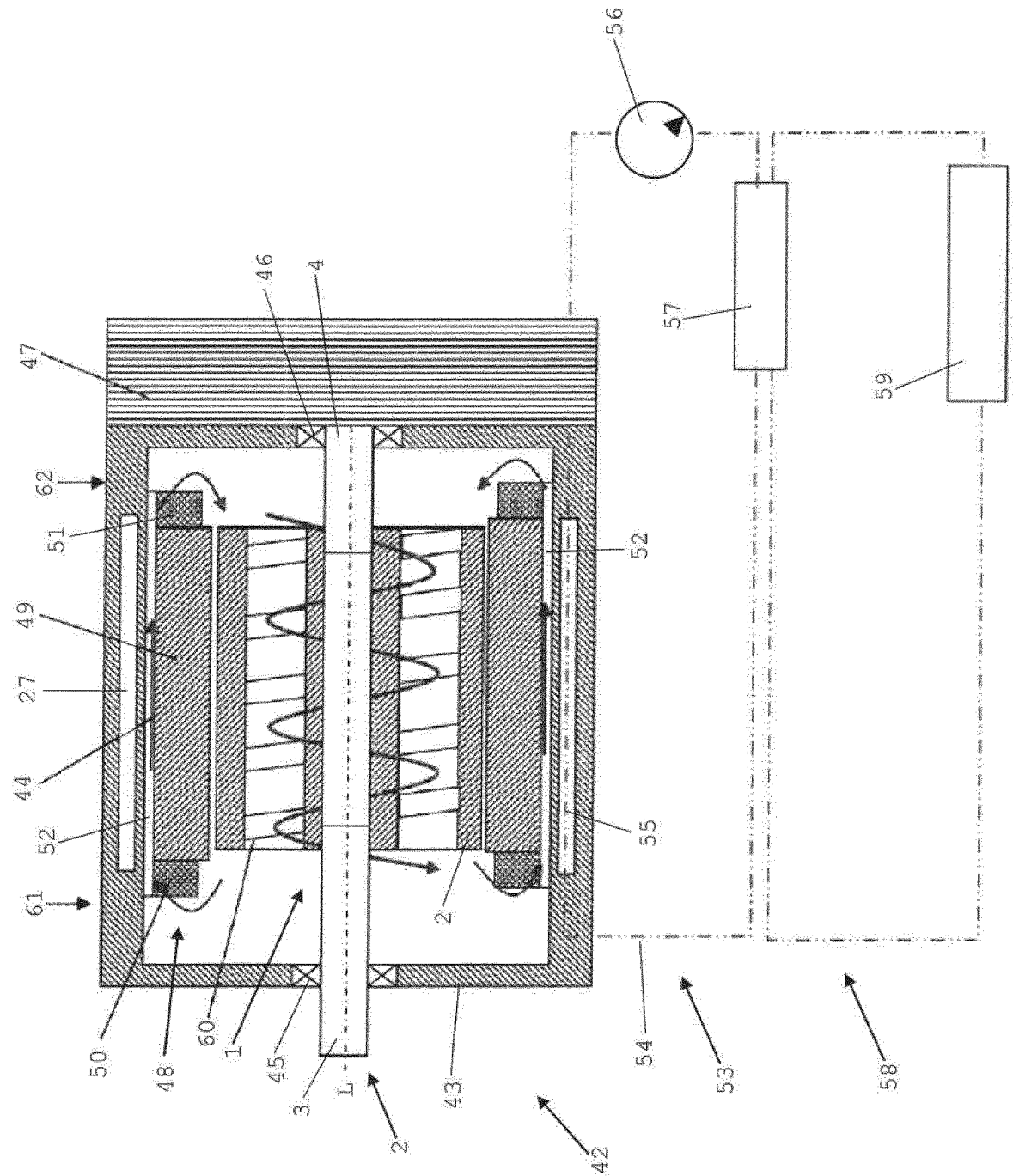
FIG. 9 is a schematic longitudinal sectional illustration of an electric machine.

FIG. 9 shows an electric machine 42 having a housing 43 and an air cooling circuit 44, the conveying direction of which within the housing 43 is indicated by arrows. Within the housing 43, a rotor shaft 2 is mounted rotatably within a first rolling bearing 45 and within a second rolling bearing 46, wherein the rotor shaft comprises a first shaft journal 3 and a second shaft journal 4. That side of the housing 43 which is illustrated on the right in FIG. 9 is adjoined by an inverter 47 of the electric machine 42.

The shaft journals 3, 4 are connected rotationally conjointly to a filler body (cf. FIGS. 1 to 8) which is not shown in FIG. 9, and which in turn is connected rotationally conjointly to a laminated rotor core 6 (not shown in FIG. 9, in this regard cf. FIGS. 1 to 8). When shaft journals 3, 4 rotate, the laminated rotor core 6 thus also rotates. The laminated rotor core 6 is radially surrounded, with a small spacing, by a static stator 48 which comprises a laminated stator core 49 and which, on its two opposite end sides, has in each case one stator winding head 50 and 51, which project in an axial direction beyond two mutually opposite axial end sides of the laminated rotor core 6. The stator 48 is surrounded with a spacing in a radial direction, over a full circumference, by the housing 43. Here, the housing 43 and the stator 48 form, between them, an outer cooling channel 52. The outer cooling channel 52 extends onward to both sides, adjoining the laminated stator core 49, between the stator winding heads 50, 51 and the housing 43.

After air has absorbed heat in particular from the rotor 1 and the stator 48, as will be illustrated below, it is re-cooled by the housing 43, which in turn is re-cooled by means of a circulation cooling circuit 53. The circulation cooling circuit 53 comprises a coolant line 54 outside the housing 43 and a liquid cooling channel 55 within the housing 43. A liquid coolant circulates within the circulation cooling circuit 53. Arranged within the coolant line 54 is a conveying pump 56 which draws coolant from the liquid cooling channel 55 into the coolant line 54 and conveys said coolant via a heat exchanger 57 back into the liquid cooling channel 54. For the cooling of the coolant within the heat exchanger 57, said heat exchanger is additionally flowed through by cooling water, which circulates in a main cooling circuit 58 and which is in turn cooled by a main water cooler 59.

If the electric machine 42 is set in operation, then the rotor shaft 2 rotates, and with it also the laminated rotor core 6 and helical-spindle-shaped cooling channels 60, which, in the exemplary embodiment shown in FIG. 9, form the ventilation unit. Instead, it is possible—as shown in FIGS. 1 to 8—for other ventilation units to be used (for example the conveying spiral 18, the fan impeller blades 36, 37 or the axial fan impeller insert 40). As a result of the rotation of the helical-spindle-shaped cooling channels 60, which each form a conveying spiral in the manner of a screw pump, a pressure side 61 and a suction side 62 form within the closed housing 43 of the electric machine 42 on mutually opposite end sides of the rotor 1.

Owing to the suction action of the helical-spindle-shaped cooling channels 60 on the suction side 62, air is drawn in via the outer cooling channel 52 over the circumference of the stator 48. Via the stator winding head 51, which is cooled as the cooling air passes, cooling air is drawn into the laminated rotor core 6 and is conveyed via the helical-spindle-shaped channels 60 to the pressure side 61 of the electric machine 42. From there, the cooling air passes the stator winding head 50 of the other stator side in order to move back to the suction side 62 over the circumference of the laminated stator core 49.

In this way, the cooling air cools in particular the laminated rotor core 6 from the inside, the rotor shaft 2 with its shaft journals 3 and 4, the rolling bearings 45 and 46, the stator winding heads 50 and 51 and the laminated stator core 49. By means of the circulation cooling circuit 53, the housing 43 is re-cooled directly, and the cooling air is re-cooled indirectly by means of the housing 43.

What is claimed is:

1. A rotor for an electric machine, the rotor comprising:
a laminated rotor core with a central longitudinal axis;
a filler body comprising an aluminum die-cast alloy cast onto the laminated rotor core;
the filler body including an inner shell surface with a first multiplicity of fins extending radially from the inner shell surface toward the central longitudinal axis, the first multiplicity of fins defining a multiplicity of air flow channels between each pair of adjacent fins, each of the multiplicity of air flow channels running parallel to the central longitudinal axis;
a first shaft journal having an air inlet opening;
a second shaft journal having an air outlet opening; and
a ventilation unit;
wherein the filler body connects the laminated rotor core rotationally conjointly to the first shaft journal and the second shaft journal;
the laminated rotor core includes a central axial bore partially filled by the filler body forming an axial cooling channel for cooling air within the central axial bore;
the shaft journals drive the ventilation unit; and
rotation of the ventilation unit draws an air stream in via the air inlet opening, conveys said air stream through the axial cooling channel, and discharges said air stream via the air outlet opening.

2. The rotor as claimed in claim 1, wherein:
the electric machine comprises a synchronous motor;
the laminated rotor core includes receiving channels within which permanent magnets are received; and
free spaces between the permanent magnets and the receiving channels are filled by the filler body to fix the permanent magnets within the receiving channels.

3. The rotor as claimed in claim 1, wherein the electric machine comprises an asynchronous motor; and
the rotor furthermore comprises:
a first short-circuiting ring comprising an aluminum die-cast alloy cast onto the laminated rotor core;
a second short-circuiting ring comprising an aluminum die-cast alloy cast onto the laminated rotor core; and
multiple short-circuiting bars comprising an aluminum die-cast alloy cast into axial grooves of an outer shell surface of the laminated rotor core such that the short-circuiting bars are connected in each case to both the first short-circuiting ring and the second short-circuiting ring.

4. The rotor as claimed in claim 1, wherein:
the ventilation unit comprises a conveying spiral arranged within the axial cooling channel; and
a drive shaft of the conveying spiral is mounted rotationally conjointly within the first shaft journal and the second shaft journal.

5. The rotor as claimed in claim 1, wherein the ventilation unit comprises fan impeller blades integrated into the shaft journals.

6. The rotor as claimed in claim 1, wherein the ventilation unit comprises an axial fan impeller insert connected rotationally conjointly in positively locking fashion to the filler body and arranged within the axial cooling channel.

7. The rotor as claimed in claim 1, further comprising multiple
second projections of the filler body projecting radially inward from the inner shell surface of the filler body;

wherein the shaft journals are fastened to the filler body with multiple connectors inserted in the multiple second projections.

8. The rotor as claimed in claim 1, wherein an inner shell surface of the filler body comprises a first centering shoulder for the first shaft journal and a second centering shoulder for the second shaft journal.

9. The rotor as claimed in claim 1, wherein the laminated rotor core is connected to the filler body in positively locking and non-positively locking fashion in the axial direction.

10. An electric machine for a vehicle, the electric machine comprising:
- a rotor with a rotor shaft mounted in two rolling bearings, the rotor comprising:
- a laminated rotor core with a central longitudinal axis;
- the filler body including an inner shell surface with a first multiplicity of fins extending radially from the inner shell surface toward the central longitudinal axis, the first multiplicity of fins defining a multiplicity of air flow channels between each pair of adjacent fins, each of the multiplicity of air flow channels running parallel to the central longitudinal axis;
- a filler body comprising an aluminum die-cast alloy cast onto the laminated rotor core;
- a first shaft journal having an air inlet opening;
- a second shaft journal having an air outlet opening; and
- a ventilation unit;
- wherein the filler body connects the laminated rotor core rotationally conjointly to the first shaft journal and the second shaft journal;
- the laminated rotor core includes a central axial bore partially filled by the filler body forming an axial cooling channel for cooling air within the central axial bore;
- the shaft journals drive the ventilation unit; and
- rotation of the ventilation unit draws an air stream in via the air inlet opening, conveys said air stream through the axial cooling channel, and discharges said air stream via the air outlet opening;
- a stator having a laminated stator core and stator winding heads arranged at opposite end sides of the laminated stator core; and
- a housing surrounding the stator in a radial direction;
- wherein the stator and the housing form, between them, an outer cooling channel running along the laminated stator core and the stator winding heads and connecting two opposite end sides of the stator winding heads to one another;
- the ventilation unit forms a suction side on a first end side of the laminated rotor core and a pressure side on a second end side of the laminated rotor core, as the rotor shaft rotates, such that air is drawn in on the suction side and conveyed through the axial cooling channel of the rotor and the outer cooling channel; and
- the housing comprises a liquid cooling channel of a circulation cooling circuit, within which a cooling liquid circulates and cools the housing.

\* \* \* \* \*